United States Patent
Habermehl

[19]

[11] Patent Number: 6,055,891
[45] Date of Patent: *May 2, 2000

[54] EXIT LOCATING SCREWDRIVER

[76] Inventor: G. Lyle Habermehl, 436 Calvert Dr., Gallatin, Tenn. 37066

[*] Notice: This patent is subject to a terminal disclaimer.

[21] Appl. No.: 09/140,218

[22] Filed: Aug. 26, 1998

Related U.S. Application Data

[63] Continuation-in-part of application No. 08/879,910, Jun. 20, 1997, Pat. No. 5,819,609, which is a continuation of application No. 08/545,399, Oct. 19, 1995, Pat. No. 5,699,704, which is a continuation-in-part of application No. 08/233,909, Apr. 28, 1994, which is a continuation-in-part of application No. 08/198,129, Feb. 17, 1994, Pat. No. 5,469,767, which is a continuation-in-part of application No. 08/018,897, Feb. 17, 1993, Pat. No. 5,337,635.

[51] Int. Cl.[7] .................................................. B25B 23/06
[52] U.S. Cl. .............................................. 81/434; 227/136
[58] Field of Search .................. 81/57.37, 434; 227/136

[56] References Cited

U.S. PATENT DOCUMENTS

| | | |
|---|---|---|
| 1,815,594 | 7/1931 | Shaw et al. . |
| 3,601,168 | 8/1971 | Farnstrom . |
| 3,623,646 | 11/1971 | Cast . |
| 3,910,324 | 10/1975 | Nasiatka . |
| 4,018,254 | 4/1977 | DeCaro . |
| 4,062,388 | 12/1977 | DeCaro . |
| 4,146,071 | 3/1979 | Mueller et al. . |
| 4,167,229 | 9/1979 | Keusch . |
| 4,367,837 | 1/1983 | Manino . |
| 4,428,261 | 1/1984 | Takatsu et al. . |
| 4,625,597 | 12/1986 | Cast . |
| 4,930,630 | 6/1990 | Habermehl . |
| 5,027,679 | 7/1991 | Kawashima . |
| 5,083,483 | 1/1992 | Takagi . |
| 5,284,074 | 2/1994 | Chen . |
| 5,303,620 | 4/1994 | Payne et al. . |
| 5,337,635 | 8/1994 | Habermehl . |

FOREIGN PATENT DOCUMENTS

| | | |
|---|---|---|
| 248101 | 12/1987 | European Pat. Off. . |
| 2750562 | 5/1979 | Germany . |
| 2132531 | 7/1984 | United Kingdom . |
| 2147873 | 5/1985 | United Kingdom . |

OTHER PUBLICATIONS

Quik Drive 3301, 3303 Informational brochure (in French and English), undated.

*Primary Examiner*—James G. Smith
*Attorney, Agent, or Firm*—Dorsey & Whitney LLP

[57] ABSTRACT

A driver for fasteners, and particularly, a power screwdriver is described which is adapted to drive screws having different diameters. The power screwdriver has a removable guide tube and complementary drive shaft. The guide tube is sized to the diameter of one size of screw. The complementary removable drive shaft is sized to be guided in the guide shaft, reciprocally movable therein to engage and guide a screw located in the guide tube. By removal of one pair of guide tube and complementary drive shaft and replacement with another pair of guide tube and complementary drive shaft adapted for use with screws having a different head diameter, the driver is adapted for driving screws of different head diameters.

12 Claims, 12 Drawing Sheets

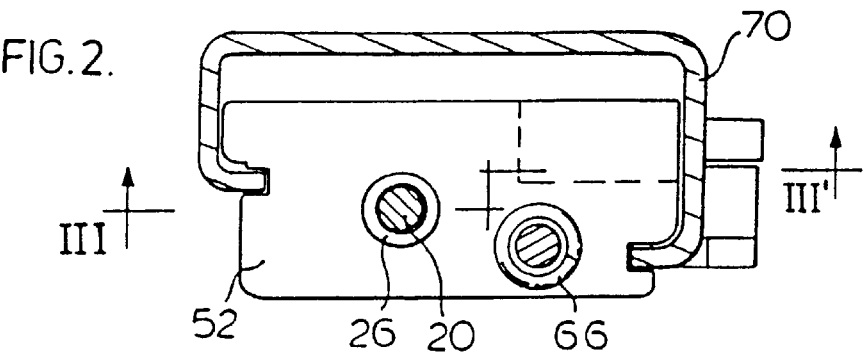
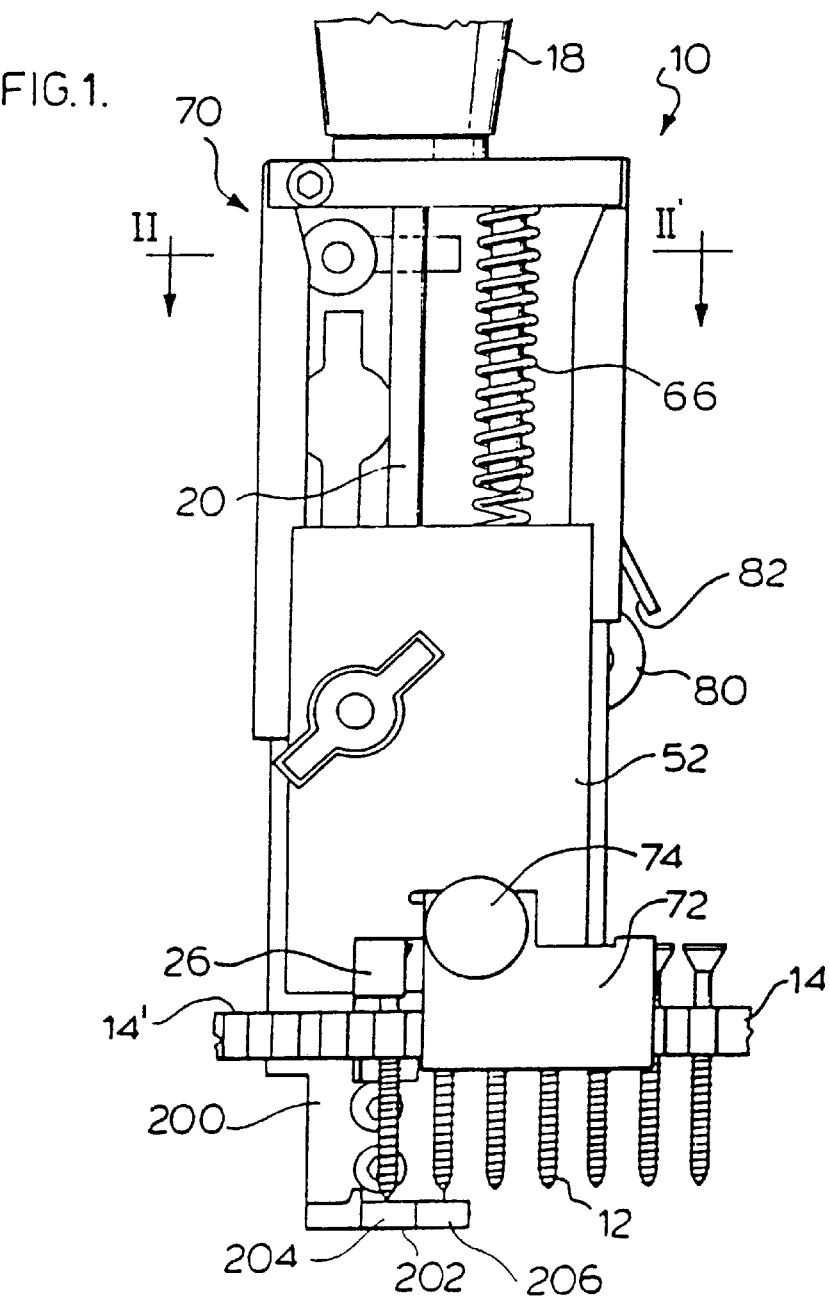

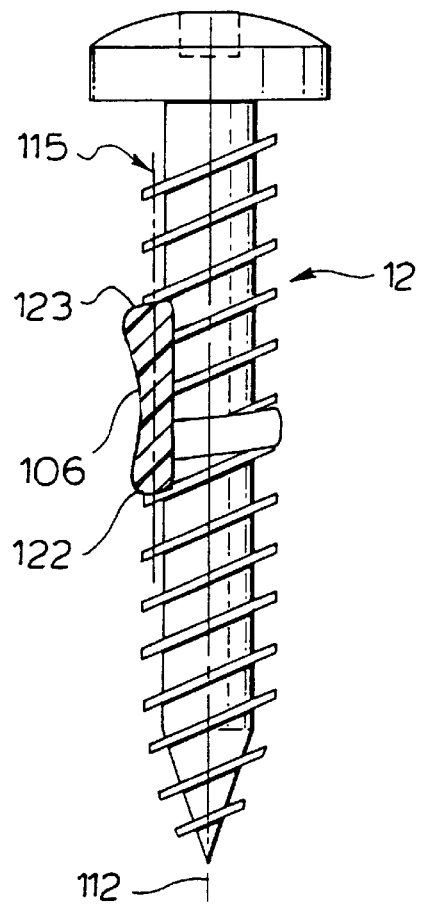
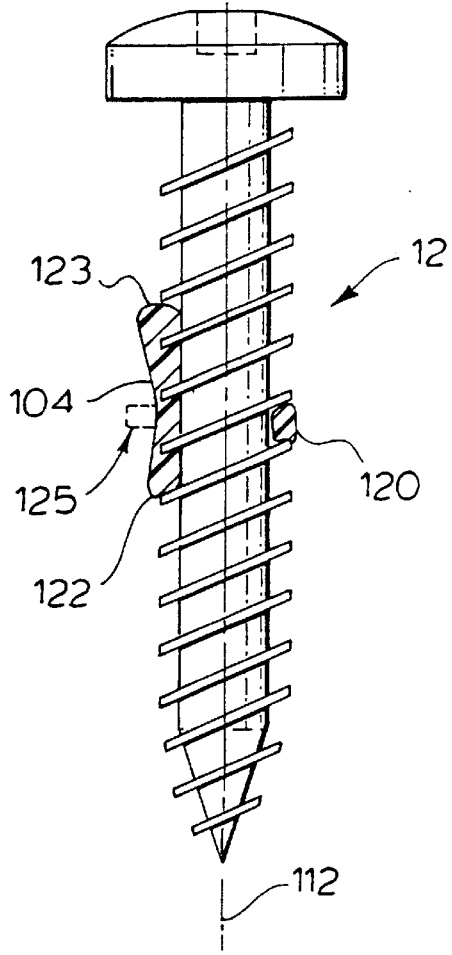
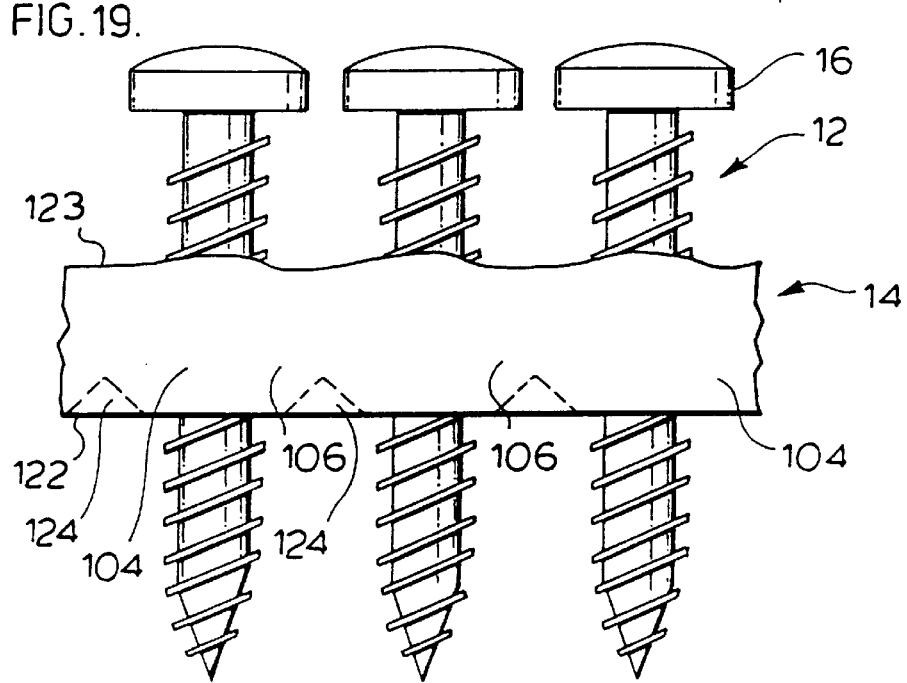

EXIT LOCATING SCREWDRIVER

RELATED APPLICATIONS

This application is a continuation in part of U.S. patent application Ser. No. 08/879,910 filed Jun. 20, 1997 now U.S. Pat. No. 5,819,609 which is a continuation of U.S. patent application Ser. No. 08/545,399 filed Oct. 19, 1995, now U.S. Pat. No. 5,699,704 which is a continuation-in-part of U.S. patent application Ser. No. 08/233,909, filed Apr. 28, 1994; Ser. No. 08/198,129, filed Feb. 17, 1994, now U.S. Pat. No. 5,469,767 and Ser. No. 08/018,897, filed Feb. 17, 1993 now U.S. Pat. No. 5,337,635.

SCOPE OF THE INVENTION

This invention relates generally to a screwdriver for driving collated screws which are joined together in a strip, and a novel collated screw strip adapted to facilitate alignment of screws in the screwdriver.

BACKGROUND OF THE INVENTION

Collated screws are known in which the screws are connected to each other by a retaining strip of plastic material. Such strips are taught, for example, by U.S. Pat. No. 4,167,229 issued Sep. 11, 1979 and related Canadian Patents 1,040,600 and 1,054,982 the disclosures of which are incorporated herein by reference. Screws carried by such strips are adapted to be successively incrementally advanced to a position in alignment with and to be engaged by a bit of a reciprocating, rotating power screwdriver and screwed into a workpiece. In the course of the bit engaging the screw and driving it into a workpiece, the screw becomes detached from the plastic strip leaving the strip as a continuous length.

In the use of such collated strips in screwdrivers, the strip serves a function of assisting in guiding the screw into a workpiece and, to accomplish this, the strip is retained against movement towards the workpiece. In the strip, each screw to be driven has its threaded shaft threadably engaged in a threaded sleeve of the strip such that on the screwdriver engaging and rotating each successive screw, the screw turns within the sleeve which acts to guide the screw as it moves forwardly into threaded engagement into the workpiece. Preferably, only after the tip of the screw becomes engaged in the workpiece, does the head of the screw come into contact with the sleeves. Further forward movement of the screw into the workpiece then draws the head downwardly to engage the sleeve and to rupture the sleeve by reason of the forward movement of the head with the strip retained against movement towards the workpiece. The sleeve preferably is configured to have fragile straps which break on the head passing through the sleeve such that the strip remains intact as a continuous length. Since the strip is a continuous length, on advancing the strip with each successive screw to be driven, it necessarily results that portions of the strip from which each screw has been driven are also advanced to exit from the power screwdriver.

Known power screwdrivers for driving such collated strips include U.S. Pat. No. 4,146,871 to Mueller et al, issued Mar. 27, 1976, and U.S. Pat. No. 5,186,085 to Monacelli, issued Feb. 16, 1993, the disclosures of which are incorporated herein by reference. Such known power screwdrivers include a rotatable and reciprocally moving screwdriver shaft which is turned in rotation by an electric motor. A screwdriving bit forms a forwardmost portion of the shaft for engaging the head of each successive screw as each screw is moved into a driving position, axially aligned under the screwdriver shaft.

An important aspect of such power screwdriver is the manner and accuracy with which each successively advanced screw is positioned so as to be properly aligned axially under the screwdriver shaft for successful initial and continued engagement between the bit and the screwdriver head in driving a screw fully down into a workpiece. In the devices of Mueller et al and Monacelli, the strip is effectively held in position, notably, by reason of the device grabbing and fixing the position of the screw beside the screw to be driven. These devices also teach location of a screw to be driven in part by the head of the screw to be driven engaging the surface in a guide channel in which the screwdriver bit is reciprocal. In each of Mueller et al and Monacelli, a specific footplate is provided to grasp and fix the position of the screw beside the screw to be driven. The footplate engages a workpiece and is spring biased towards the workpiece. On the device being brought into engagement with the workpiece, the footplate retracts towards the device. The footplate has a conical recess which engages the tip of the screw next to the screw to be driven and applies a force to that screw pushing it rearwardly so that its head bears on a locating plate in the screw feed mechanism. By reason of this next screw being firmly clamped between the footplate and locating plate, the strip is effectively locked into position and thereby positions the screw which is to be driven. Such footplates, however, have the disadvantage of being separate movable parts which must move forwardly to permit successive screws to be advanced and then rearwardly to clamp the next screw.

Another disadvantage of prior art devices in which the device grabs the screw beside the screw to be driven is that such systems do not permit the very last screw in any strip to be driven without possible difficulties. The last screw therefore frequently has to be discarded and/or may result in jamming. This is a particular disadvantage where screws are collated into strips which do not have a large number of screws. For example, in a simple strip of twenty-four screws, to discard every twenty-fourth screw is a substantial disadvantage.

Another disadvantage of prior art devices appreciated by the applicant is that screw advance mechanisms such as those used in U.S. Pat. No. 4,146,871 utilize pawls which on withdrawal of the pawl so as to be in a position to advance the next successive screw of the screw strip tend to frictionally engage and to some extent withdraw the entire screw strip when this is not required. Such "feed pawl drawback" is disadvantageous insofar as it can withdraw a screw to be driven from axial alignment with the driver shaft.

SUMMARY OF THE INVENTION

Accordingly, to at least partially overcome the disadvantages of previously known systems, the present invention provides an improved screwdriver assembly which supports the strip adjacent the screw to be driven on the exit side of the screw.

An object of the present invention is to provide a screwdriver assembly for driving collated screws which has fewer parts and/or is inexpensive to manufacture.

Another object is to provide an improved collated strip containing screws which includes locating devices on the strip to assist in locating screws to be driven.

Another object is to provide a collated screw strip and screwdriver therefore which avoids difficulties with "feed pawl drawback".

The present invention provides in the context of collated screws or other fasteners collated together by a continuous strip which remains intact after a screw has been driven from the strip, a screwdriver assembly which at least in part locates a screw to be driven by providing a rearwardly directed strip supporting surface forward of the strip to engage an exiting portion of the strip from which a screw has been driven. The strip supporting surface may be complementarily shaped to the surface of the strip to be engaged. In a preferred embodiment, the strip supporting surface may have a projection or a notch to engage with a respective complementary notch or projection in a forwardmost surface of the strip to more positively locate the strip.

The locating system comprising the strip supporting surface and complementary strip may be used alone or in conjunction with one or more other locating features such as those in which the head of a screw is engaged within a guideway. The locating system of the strip supporting surface and complementary strip is advantageous in permitting the last screw in a strip to be driven.

In one of its aspects, the present invention provides a screwdriver assembly to drive screws collated together in a strip spaced in parallel relation from each other, the screwdriver comprising:

a cylindrical guideway to receive a screw coaxially therein, a screw-and-strip entranceway opening generally radially into the guideway on a first side thereof, a strip exitway opening generally radially out of the guideway on a second side thereof opposite the entranceway, the guideway entranceway and exitway juxtapositioned to permit screws collated in a strip spaced in parallel relation from each other to be successively advanced through the entranceway radially into the guideway to locate each successive screw coaxially within the guideway with portions of the strip from which screws have been driven extending from the guideway via the exitway, elongate, rotatable driver shaft means having at a forward end bit means, the shaft means reciprocally movable axially in the guideway to engage the screw with the bit means and drive the screw axially forwardly from the guideway into a workpiece, the exitway having an axially, rearwardly directed strip supporting surface axially forward of the strip for engagement by the strip to support the strip against movement forwardly on the shaft means driving a screw axially forwardly.

Preferably, the strip supporting surface includes a screwdriver assembly as claimed in claim 1 wherein the strip supporting surface includes support locating means to engage in registry with strip locating means on the strip to locate the strip in a desired position to assist in maintaining the screw coaxially disposed within the guideway.

BRIEF DESCRIPTION OF THE DRAWINGS

Further aspects and advantages of the present invention will be apparent from the following description taken together with the drawings in which:

FIG. 1 is a pictorial front view of a power driver in accordance with U.S. Pat. No. 4,146,071 modified to incorporate a guide tube in accordance with a first preferred embodiment of the present invention and having a slide body in an extended position;

FIG. 2 is a cross-sectional top view of the power driver of FIG. 1 along section line II-II';

FIG. 17 is a cross-sectional end elevation view of the strip in FIG. 16 along line 17-17';

FIG. 18 is a cross-sectional end elevation view of the strip of FIG. 16 along line 18-18'; and FIG. 19 is a rear view of the strip of FIG. 16.

DETAILED DESCRIPTION OF THE DRAWINGS

Figure 3:
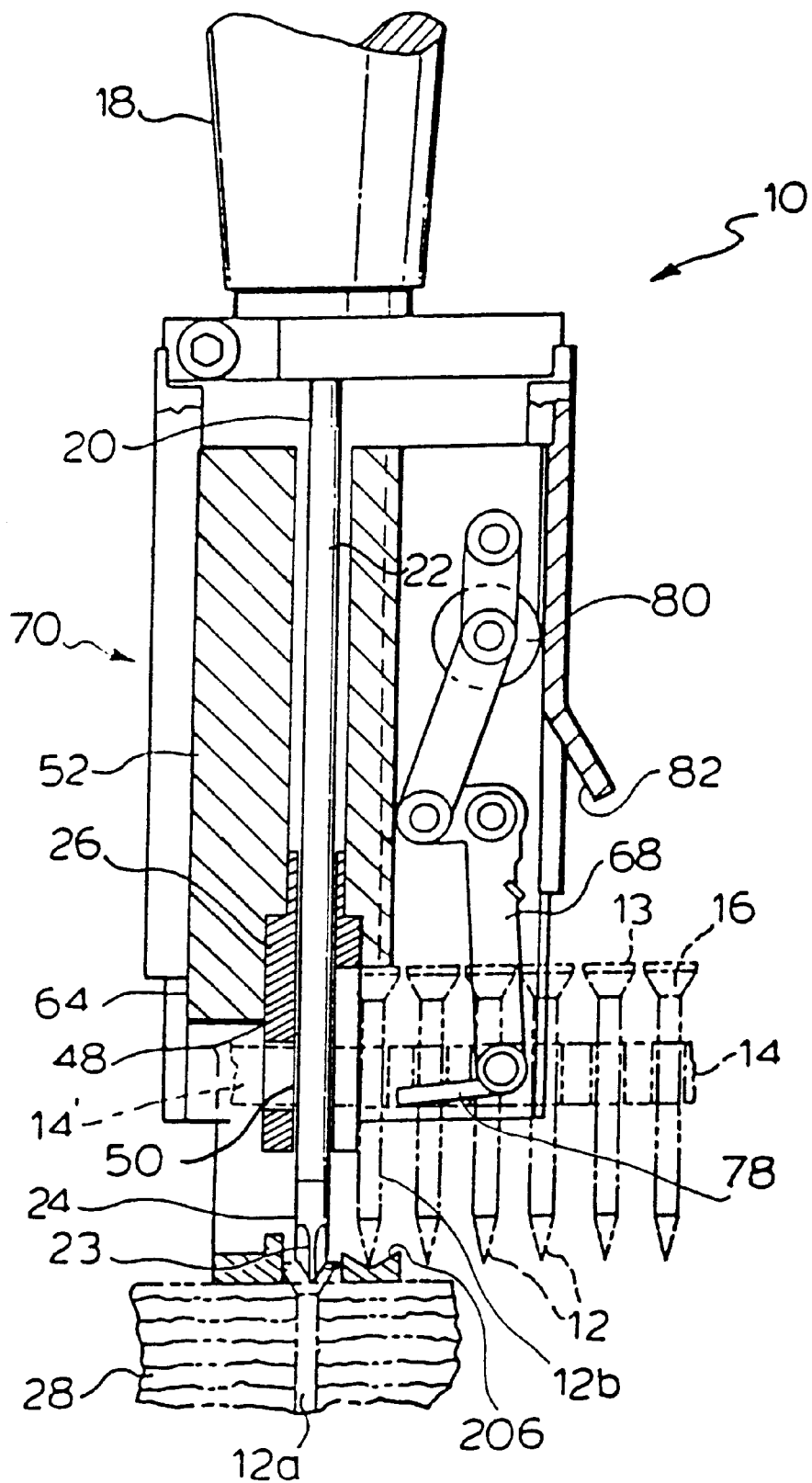
FIG. 3 is a schematic cross-sectional front view of the power driver of FIG. 2 along section line III-III'.

Reference is made first to FIGS. 1, 2, and 3 which show in part an electrically powered screwdriver 10 of the type disclosed in U.S. Pat. No. 4,146,071. The screwdriver 10 is used in driving screws 12 which have been collated and secured together in a parallel spaced relationship by a retaining strip 14 preferably of plastic. Such strips 14 are taught in U.S. Pat. No. 4,167,229.

The screwdriver 10 includes a chuck 18 which is rotated by an electric motor of a power driver not otherwise shown. The chuck 18 engages an end of an elongate metal shaft 20 best seen in FIG. 3 consisting of a generally cylindrical metal mandrel 22 having removably secured to a lowermost end thereof, an axially aligned metal bit 24. The bit 24 defines at a forwardmost end a screwdriving tip 23, adapted for engaging a complementary shaped recess 13 formed in the head 16 of the screw 12. In a manner described in greater detail hereafter, while rotating, the mandrel 22 carrying the bit 24 is reciprocated within cylindrical guideway in a guide tube 26 to engage and drive successive screws 12 into a workpiece 28. The guide tube 26 is secured in slide body 52. The screwdriver 10 of the present invention in essence has identical elements and operates to drive screws in an identical manner to that disclosed in U.S. Pat. No. 4,146,871.

Figure 4:
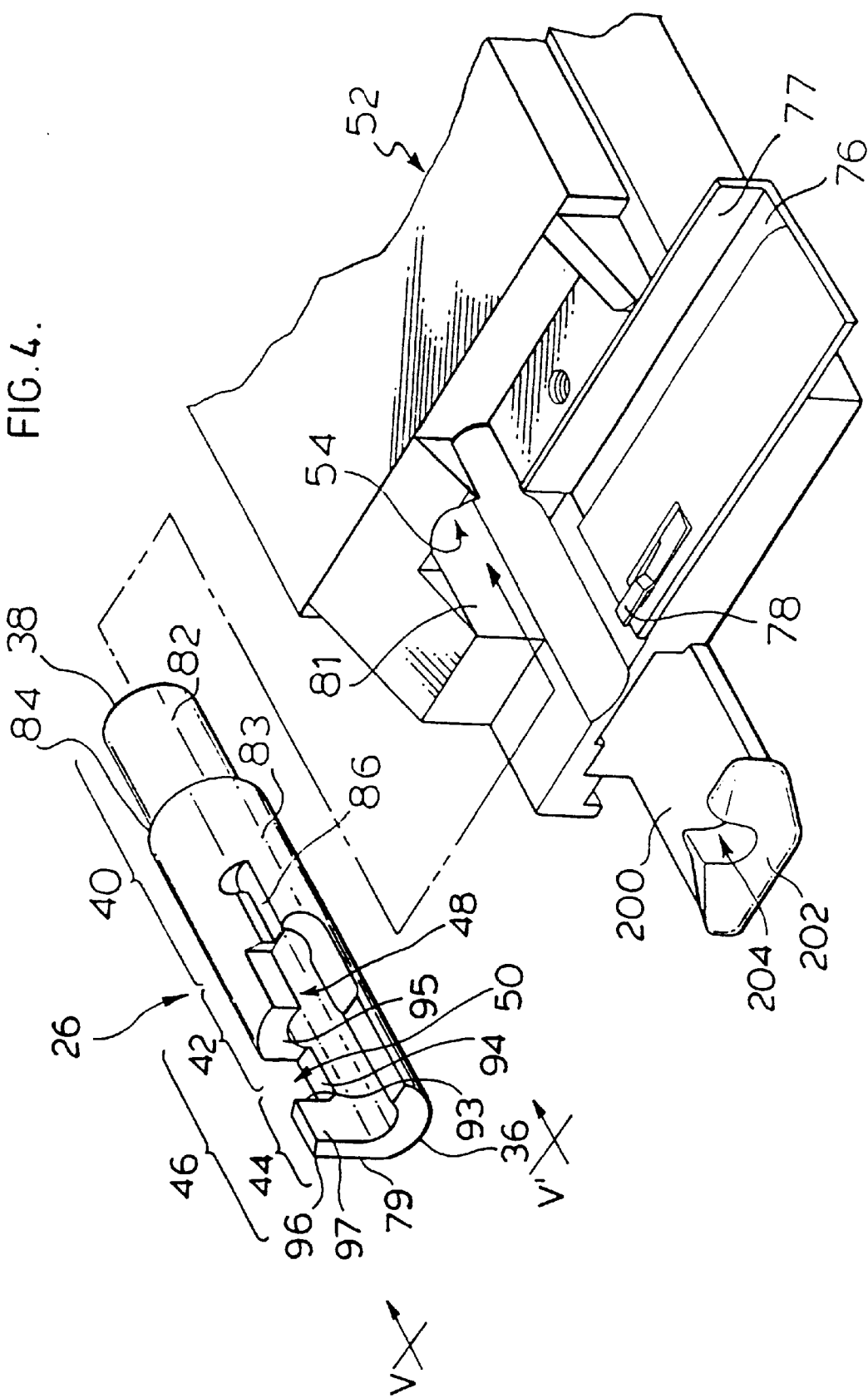
FIG. 4 is an exploded partially pictorial view of the front of the slide body of the power screwdriver together with the guide tube as shown in FIGS. 1, 2 and 3.

In this regard, as best seen in FIGS. 1, 2 and 3, the screwdriver has a housing 70 to which a power driver (not shown) is fixed by the power driver's chuck 18. Slide body 52 is coupled to housing 70 for sliding displacement parallel to a longitudinal axis through the shaft 20 between an extended position as shown in FIG. 1 and a retracted position shown in FIG. 3. Coil spring 66 biases the slide body 52 relative to the housing 70 to the extended position. The slide body 52 includes a guide channel for the screw strip 14 carrying the screw 12. The guide channel is defined under a removable cover plate 72 shown in FIG. 1 and removable by thumb screw 74. The guide channel is best shown in the enlarged view of the front of the slide body in FIG. 4 with the cover plate 72 removed. In FIG. 4, a groove 76 receives the head of a screw 12 with the top of a screw engaging surface 77. A screw feed advance mechanism is mounted in slide body 52 and activated by relative movement between the housing 70 and the slide body 52. In this regard, pawl arm 78 shown in FIGS. 3 and 4 reciprocates back and forth to advance successive screws. Pawl arm 78 is moved by a mechanical linkage including lever 68 moved by wheel 80 engaging ramped surface 82 of the housing 70 shown in FIGS. 1 and 3 on the slide body 52 reciprocating between extended and retracted positions.

Figure 5:
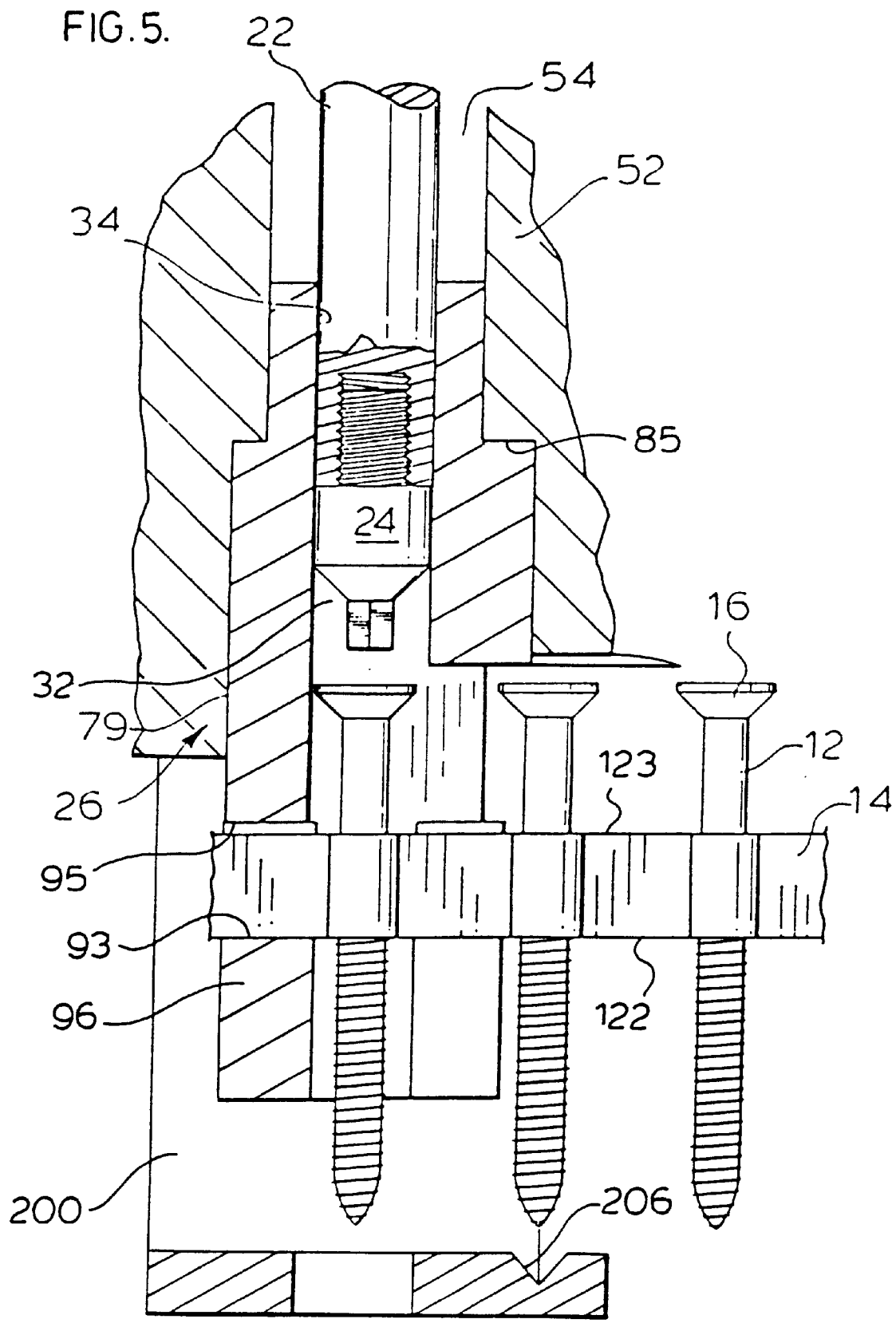
FIG. 5 is a partial cross-sectional top view along section line V-V' in FIG. 4 with the guide tube inserted in the slide body.

FIGS. 4 and 5 show a guide tube 26 adapted to be removably secured in a cylindrical bore 54 which extends through slide body 52, and in this regard, each has a complementary shape. To locate the guide tube 26 within the bore against axial rotation, one side of the guide tube has a flat external surface 79 to mate with a corresponding flat surface 81 in the otherwise generally cylindrical bore 54. The exterior of the guide tube has a stepped configuration with a reduced diameter rear section 82 and a larger diameter main portion 83 with a rearwardly directed shoulder 84 therebetween. The bore 54 is similarly shaped to axially locate the guide tube as best seen in FIG. 5 with a corresponding forwardly directed shoulder 85 in the bore 54. As seen in FIG. 4, a slot 86 is cut into the guide tube into which slot the rearmost left hand corner of the cover plate 72 shown in FIG. 1 will fit such that the cover plate will retain the guide tube 26 secured in place.

The slide body 52 carries a foot plate 200 which is slidably mounted to the slide body 52 for sliding in a direction parallel the longitudinal axis of the shaft 20 between an extended position shown in FIG. 1 and a retracted position shown in FIG. 3. The foot plate 52 is biased to the extended portion by a spring (not shown) acting between the foot plate and the slide body. The foot plate 200 has a touchdown surface 202 to engage a workpiece, an opening 204 through which a screw 12 is to be driven, and a conical locating recess 206 best seen in FIG. 3.

The present invention is focused on features of the guide tube 26 and its interaction with screw strip 14. A cylindrical bore or guideway 32 extends axially through the center of the guide tube 26 with the guideway 32 delineated and bordered by a radial extending cylindrical sidewall 34, and open at its forward axial end 36 and its rearward axial end 38.

Portions of the side wall 34 are removed to provide, firstly, an entranceway generally indicated as 48 for the strip carrying each successive screw 12 to enter the guide tube 26 on an entry side of the tube and, secondly, an exitway generally indicated as 50 on the exit side of the guide tube 26 opposite the entry side for the strip 14' from which the screws have been driven to exit guide tube 26.

The entranceway 48 is sized so as to permit the strip carrying a screw to enter the guideway 32 moving generally radially while being maintained parallel to the axis of the guide tube. The exitway 50, is provided of a size to permit the spent plastic strip 14' from which screws 12 have been driven to exit from the guideway 32.

As best seen in FIG. 4, the exitway 50 is defined by forward surface 93, side surface 94 and rear surface 95.

The forward surface 93 is provided as seen in FIG. 4 by a portion 96 of the sidewall 34 forward of the exitway 50 being retained between flat surface 79 and a parallel inner surface 97 extending upwardly from where it is tangent to the inner sidewall 34.

The forward surface 93 is provided as an axially, rearwardly directed strip supporting surface which is axially forward of the strip for engagement of the strip to support the strip against movement forwardly on the shaft 20 driving a screw forwardly. As best seen in FIG. 5, the forward surface in effect provides a rearwardly directed shoulder to engage a forward surface 122 of the strip 14 and prevent its forward movement. With the forward surface 93 and the forward surface 122 of the strip 14 having complementary shapes, as shown with both being flat and planar in FIG. 5, their engagement assists in holding a screw axially in alignment with the bit 24.

Similar to forward surface 93, the rear surface 95 of the exitway 50 as shown in FIG. 5 is provided as an axially, forwardly directed strip supporting surface which is axially rearward of the strip 14. The rear surface 95 in effect provides a forwardly directed shoulder which can engage a rear surface 123 of the strip 14 to assist in maintaining the strip 14 guided within the exitway 50.

The guide tube 26 is indicated as having a rearward portion 40 adjacent the rearward axial end 38 and a forward portion 46 adjacent the forward axial end 36. In rearward portion 40 of the guide tube 26, the sidewall 34 preferably extends 360°. As seen best in FIG. 4, the forward portion 46 is shown as having a first engagement section 42 and a forwardmost section 44.

The forward position 46 has substantially throughout its length the entranceway 48, shown in the drawings as being on the right hand side of the guide tube 26. This entranceway or access opening 48 extends to the forward axial end 36 of the guide tube 26. The entranceway 48 is sized to permit the strip 14 carrying a screw 12 to move radially inwardly into the guideway 32 from the right as seen in the Figures. As the screw preferably has a screw head diameter marginally smaller than the diameter of the sidewall 34, it follows that where the head of the screw is to enter the guideway 32, the entranceway 48 must have a circumferential extent of at least about 180°. Where the shank of the screw is to enter the guideway, the entranceway may have a lesser circumferential extent.

The first engagement section 42 of the forward portion 46 is a section into which the head of a screw 12 is moved when the strip 14 and screw 12 are advanced. In the first engagement section 42, the wall 34 of the guide tube 26 engages the radially outermost periphery of the head 16 of the screw 12, to axially locate the screw head 16 coaxially within the guideway 32 in axial alignment with the bit 24. In this regard, in the forward engagement section 42, the walls 34 extend about the screws sufficiently to co-axially locate the screw head. The first engagement section 42 preferably extends about the screw head at least 120°, more preferably, at least 150° and, most preferably, about 180 °.

When the guide tube 26 is fully inserted and secured in the bore 54, the forward portion 46 extends beyond a front surface of the slide body 52 a sufficient distance such that the screws 12 are aligned with entranceway 48 and retaining strip 14 is aligned with exitway 50.

The shaft 20 is adapted for sliding insertion into the guide tube 26 via the rearward axial end 38. The interior sidewall 34 in the rear portion 40 of the guide tube journals the continuous cylindrical exterior surface of the cylindrical mandrel 22. Thus, as seen in FIG. 3 the guide tube 26 journals the mandrel 22 within the bore 54 with the mandrel spaced from the walls of the bore rearward of the guide tube.

With the guide tube 26 secured in the slide body 52, the mandrel 22 and bit 24 are axially aligned with the guide tube 26 by engagement with the sidewall 34 to maintain the shaft 20 substantially coaxially aligned in the guide tube 26.

As best seen in FIG. 3, the screws 12 to be driven are collated to be held parallel and spaced from each other by a plastic retaining strip 14. In use of the strip 14 in the screwdriver 10, in order for each successive screw 12a to be engaged and driven into the workpiece 28, each screw 12a is first advanced into axial alignment with the mandrel 22 and bit 24 by the pawl arm 78 of the screw feed mechanism. The screw feed mechanism engages and advances the plastic strip 14 as the bit 24 and mandrel 22 are moved in the return stroke away from the workpiece 28 under the force of spring 66. The screws 12 are moved radially into the guideway 32 through the entranceway 48. The advanced screw 12a is held in position in axial alignment with the shaft 20 and bit 24 with its screw head 16 abutting the sidewall 34 in the first engagement section 42 of the guideway. As the screw 12a is moved into the cylindrical guideway 32, the leading portion of the strip 14' from which screws have previously been driven extends outwardly from the guideway 32 through the exitway 50 in the forwardmost section 44, permitting substantially unhindered advance of the screws 12 and strip 14.

The cylindrical guideway 32 has a diameter which is selected so that the portion of the sidewall 34 about the entranceway 48, engages and supports an outermost circumferential surface of the screw head 16.

In operation, with the guide tube 26 inserted into slide body 54, a bit 24 having the desired screwdriving tip 23 is secured to the mandrel 22 and the bit 24 and mandrel 22 are located in the guideway 32 as previously described. A number of screws 12 collated by plastic retaining strip 14 are inserted into the screwdriver 10. To drive screw 12a into workpiece 28, the power driver is activated to rotate the shaft 20. The mandrel 22 and bit 24, while they are rotated, are reciprocally movable in the guideway 32 towards and away from the workpiece 28. In a driving stroke, manual pressure of the user pushes the housing 70 towards the workpiece 28. With initial manual pressure the footplate 200 engages the workpiece 28 and the footplate 200 is slid rearwardly from the extended portion of FIG. 1 to its retracted position of FIG. 3 since the spring biasing the footplate 200 forwardly is not as strong as the spring 66. In moving rearwardly, the conical locating recess 206 receives the tip of the screw 12b next to the screw 12a to be driven. The footplate 200 urges the screw 12b into surface 77 thereby securely and precisely locating screw 12b in a relation parallel the axis of the drive shaft 20. With screw 12b being securely located, the plastic strip 14 holding the screw 12a assists in locating screw 12a in alignment with drive shaft 20.

Manual pressure of the user first telescopes the footplate 200 to the retracted portion where the footplate's rearward sliding is prevented by screw 12b, thereafter manual pressure compresses spring 66 so as to move slide body 52 relative the housing 70 into the housing 70 from an extended position to a retracted position. On release of this manual pressure, in a return stroke the compressed spring 66 moves the slide body back to the extended position thereby returning the mandrel 22 and bit 24 by moving them back from the workpiece 28.

In a driving stroke as the shaft 20 is axially moved towards the workpiece 28, the driving tip 23 engages the screw head 16 to turn the screw 12a in rotation. As is known, the plastic strip 14 is formed to release the screw 12a as it is turned in rotation by the bit 24. Preferably, on release of the screw 12a, the plastic strip 14 deflects away from the screw 12a outwardly through the exit opening 50 so as not to interfere with the screw 12a in its movement into the workpiece 28. After the screw 12a is driven into the workpiece 28, the mandrel 22 and bit 24 are axially moved away from the workpiece 28 under the force of the spring 66 and a successive screw 12 is moved via the screw feed advance mechanism through the entranceway 48 into axial alignment with the shaft 20.

Figure 6:
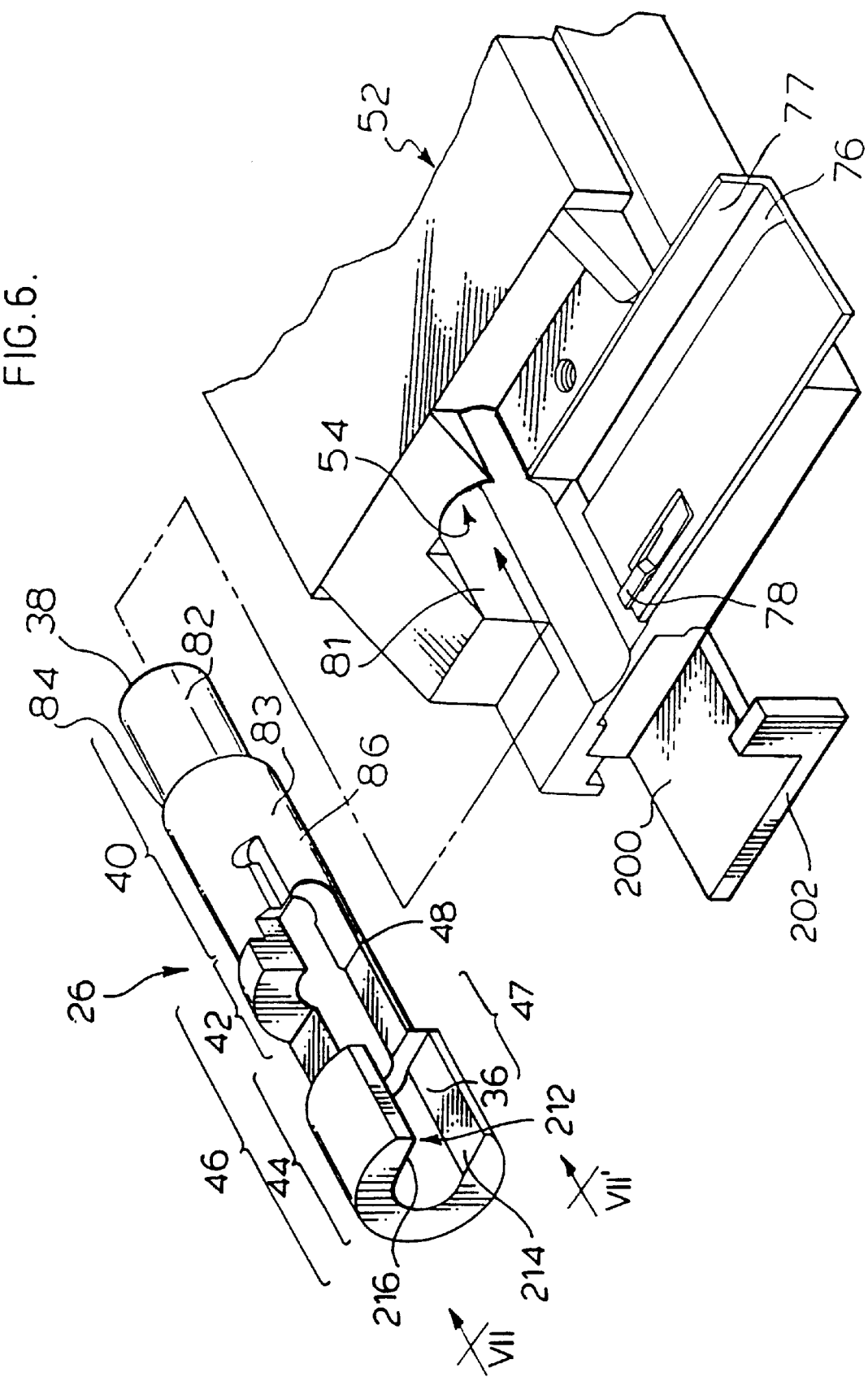
FIGS. 6 and 7 are views similar to FIGS. 4 and 5 but with the guide tube and slide body modified to have a configuration in accordance with a second embodiment.
Figure 7:
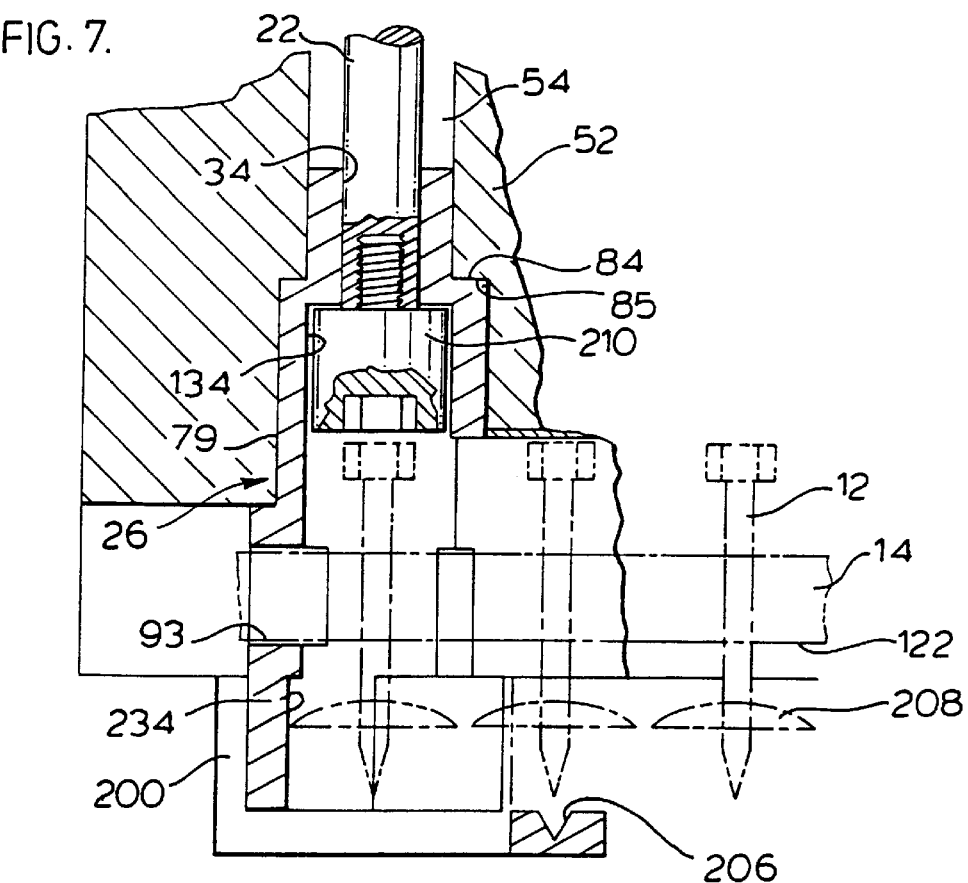

Reference is made to FIGS. 6 and 7 which show as a second embodiment of the present invention, a modified guide tube 26 and slide body 52 adapted for driving a screw strip 14 in which hexagonally-headed screws 12 carry washers 208 between the strip 14 and the tips of the screws. Such a screw strip 14 carrying washer 208 may preferably be of the type disclosed in U.S. Pat. No. 4,930,630 to Habermehl issued Jun. 5, 1990 which is incorporated herein by reference.

Guide tube 26 in FIGS. 6 and 7 is identical to guide tube 26 in FIGS. 4 and 5 with two exceptions.

Firstly, the guide tube 26 of FIGS. 6 and 7 is shown with the first engagement portion 42 as having an internal sidewall 134 of a diameter greater than the interior diameter of sidewall 34 in the rear portion 40. The interior diameter of the forward portion 46 is shown to be larger so as to permit fasteners to be driven which have a greater head diameter than the diameter of the mandrel, or which require a socket 210 as shown in FIG. 7 or a bit which is of a greater diameter than the diameter of the mandrel 22. In FIG. 7 the socket 210 is shown as having a diameter marginally less than that of the internal sidewall 134 such that engagement between the sidewall 134 and the socket 210 assists in coaxially locating the screws 12 in the guide tube 26 once a screw may be engaged by the socket 210. FIG. 7 shows the mandrel 22 carrying a socket 210 to engage the hexagonal heads of screws 12. The enlarged diameter sidewall 134 extends rearwardly beyond the entranceway 48 sufficiently to permit the socket 210 to be withdrawn rearwardly behind each screw to be driven.

Secondly, the guide tube 26 of FIGS. 6 and 7 is shown with a second engagement portion 47 having a sidewall 234 with an internal diameter which is greater than the interior diameter of sidewalls 34 and 134. The diameter of the sidewall 234 in the second engagement portion 47 is marginally greater than that of the washers 208 such that engagement between the sidewall 234 and the washers 208 assists in coaxially locating the screws 12 in guide tube 26. Preferably as shown the sidewall 234 extends about the washer 208 about 180° to maximize the ability of the sidewall 234 to locate the washer 208. As shown an entranceway 212 is provided radially into the second engagement portion 47 from the right between entrance ramp surfaces 214 and 216 which assist in guiding a washer 208 into the second engagement portion 47. The sidewall 234 need not extend 180° about the washer but preferably extends thereabout at least 120°. The entranceway 212 must have a circumferential extent of at least about 180° where the washer 208 is to enter.

FIGS. 6 and 7 also show minor modifications of the footplate 200 so as to avoid interference with the larger exterior diameter portion of the guide tube 26 which extends forwardly from the exitway 50, and, to locate locating recess 206 further to the right due to the increased spacing between centres of the screws shown in FIG. 7.

Figure 8:
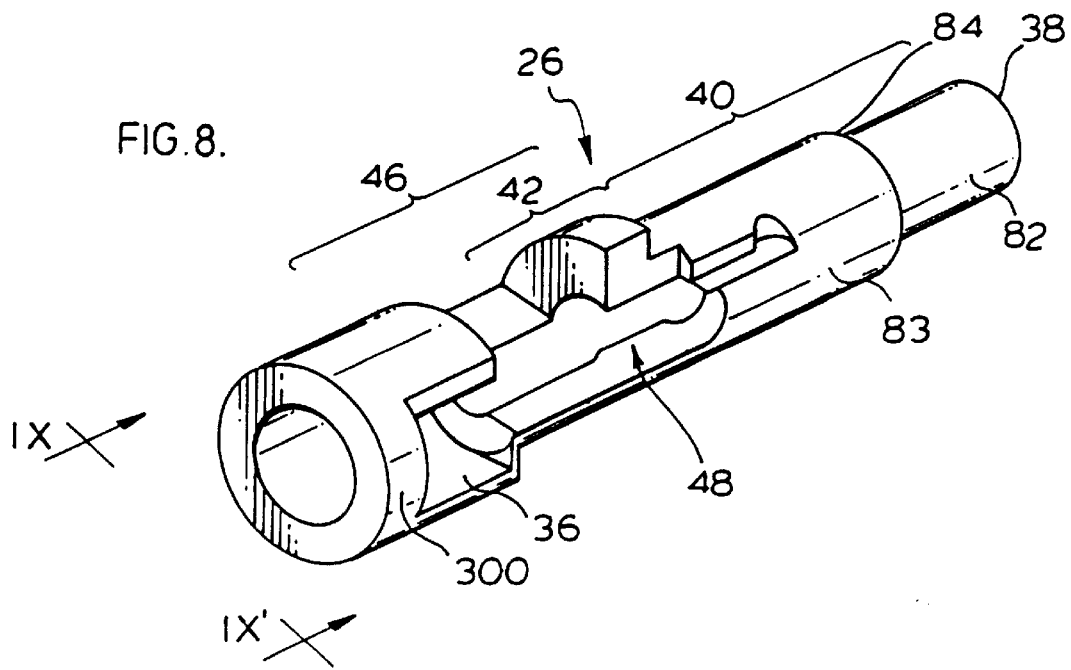
FIGS. 8 and 9 are views the same as FIGS. 6 and 7 respectively but with the guide tube modified to have a configuration in accordance with a third embodiment.
Figure 9:
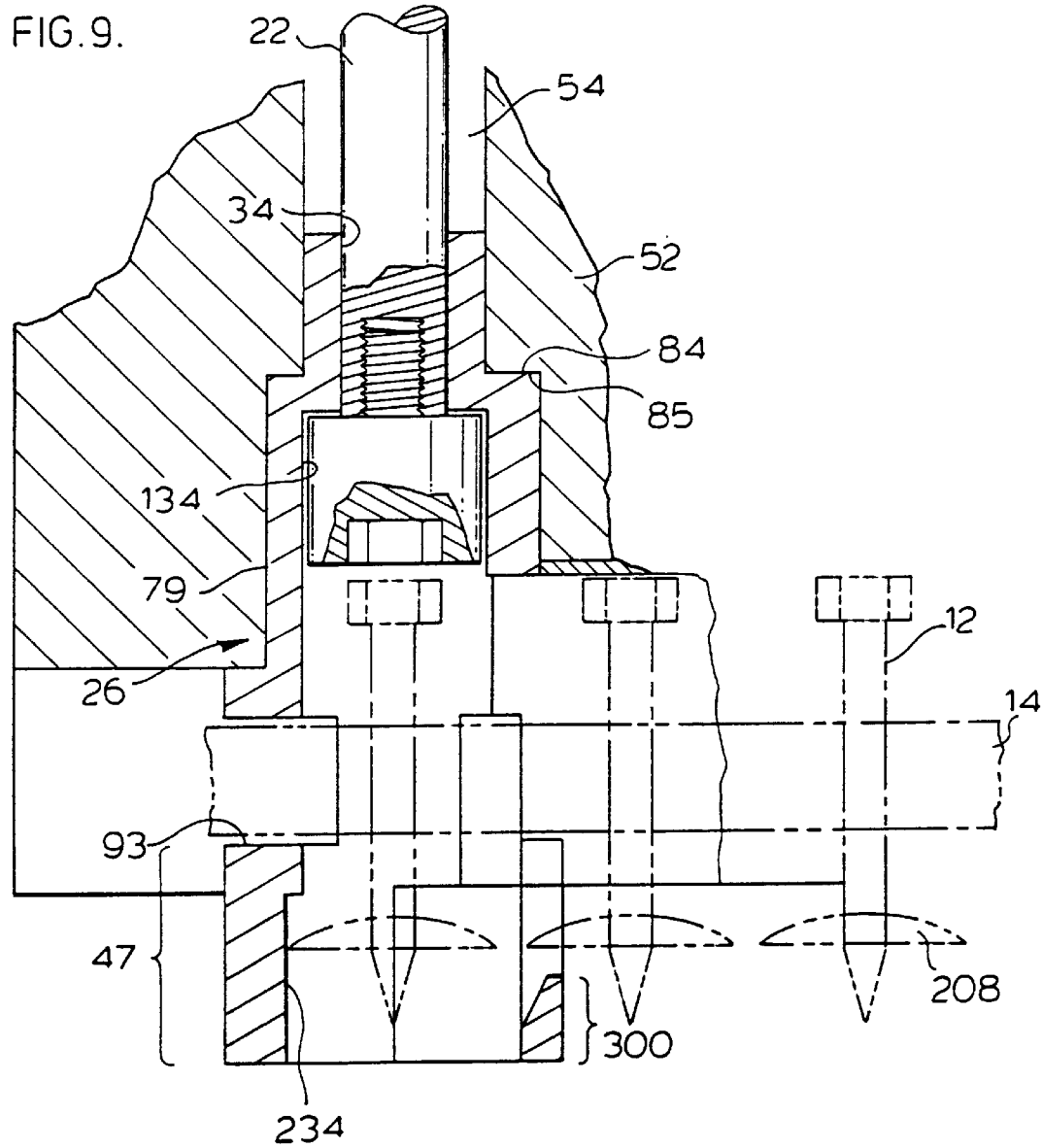

FIGS. 8 and 9 are views identical to FIGS. 6 and 7 but showing a third embodiment of the invention in which the second engagement section 47 includes a forward nose portion 300 in which the sidewall 234 extends 360° about a screw. Rearward of forward nose portion 300, the entranceway 212 is provided for access of the washer 208. The forward nose portion 300 is shown as having its interior surface tapering inwardly and forwardly to assist in camming the washer 208 into coaxial alignment on downward movement and to prevent a washer from being caught on the rearward edge of the forward nose portion 300. The guide tube 26 of FIG. 9 may be used in a driver without footplate 200.

It is to be appreciated that the guide tube 26 for example as shown in FIGS. 4 and 5 is adapted to drive the screws 12 having a shape and size as shown in FIG. 5. To drive screws 12 having a different diameter or length it is necessary merely to replace the guide tube 24 by a different guide tube 26. This can be done in the context of FIG. 5, merely by removing the cover plate and possibly the bit. In some cases, for example to switch from the configuration of FIG. 4 to that of FIG. 6, the footplate 200 needs to be replaced or if provided to be adjustable, adjusted to move the recess 200 to a correct spacing. Pawl 78 can be configured via its feed linkage to advance screw strips with different spacings between screws. Changing of the guide tubes 26 can be without substantial disassembly. Guide tube 26 is preferably made of wear resistant material and as it is removable this can assist in extending the life of the tool.

While preferred embodiments show tools having removable guide tubes 26, this is not necessary and a permanent guide tube 26 could be utilized.

In FIG. 7 the exitway 50 is shown to also provide forward surface 93 to assist in locating the strip 14.

Reference is now made to FIGS. 10 to 13 which show a fourth embodiment of the present invention in which the screw strip 14 is modified to provide a locating system to permit location of the strip 14 relative the guide tube 26.

Figure 10:
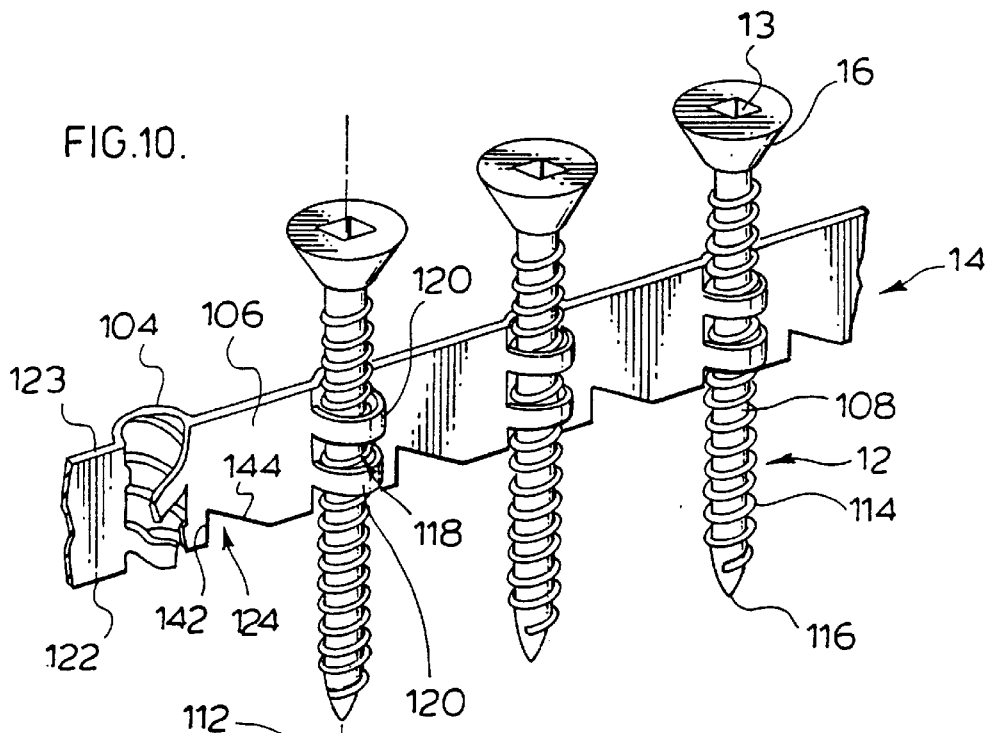
FIG. 10 is a perspective view of a screw strip in accordance with a fourth embodiment of the present invention having locating notches or slots.

FIG. 10, shows screws 12 held in a plastic holding strip 14 substantially in accordance with Canadian Patent 1,054,982, the disclosure of which is incorporated herein by reference. The strip comprises an elongate thin band formed of a plurality of identical sleeves 104 interconnected by lands 106. A screw 12 is received within each sleeve 104. Each screw 12 has a head 16, a shank 108 carrying external threads 114 and a tip 116. As shown, the external threads extend from below the head 16 to the tip 116.

Each screw is substantially symmetrical about a central longitudinal axis 112. The head 16 has in its top surface a recess 13 for engagement by the screwdriver bit 24.

Each screw is received with its threaded shank 108 engaged within a sleeve 104. In forming the sleeves about the screw, as in the manner for example described in Canadian Patent 1,040,600, the exterior surfaces of the sleeves come to be formed with complementary threaded portions which engage the external thread 114 of the screw 12. Each sleeve 104 has a reduced portion between the lands 106 on the first side of the strip and therefore on the first side of each screw. This reduced strength portion is shown as a substantially vertically extending longitudinal slot 118 bridged by two thin strap-like portion or straps 120.

The strip 14 holds the screw 12 in parallel spaced relation a uniform distance apart. The strip has a forward surface 122 and a rear surface 123. Locating notches 124 are provided in the strip extending upwardly from the forward surfaces 122 with the notches 124 spaced from each other the same distance that the screws are spaced. Notches 124 are preferably formed at the same time that the strip is formed by an extrusion process which, in effect, captures the screws between two rotating forming wheels. The forming wheels may be modified so as to form the plastic strip with the suitably spaced notches.

The notches 124 are formed with a notch leading ramp-like engagement surface 142 and a notch trailing ramp-like engagement surface 144.

Figure 11:
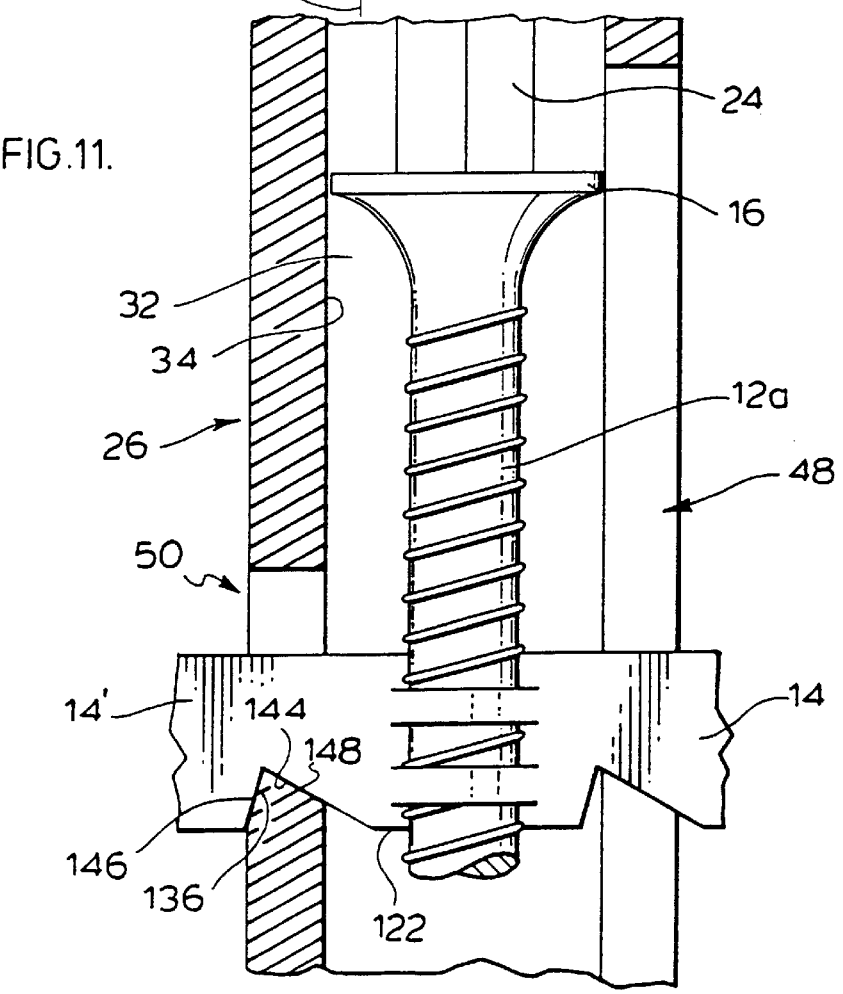
FIG. 11 is a view similar to that of FIG. 4 showing the guide tube of FIG. 4 modified for use with the notched screw strip of FIG. 8.

FIG. 11 shows an enlarged view of a guide tube 26 similar to the guide tube of FIG. 5 but with the exitway 50 having its forward surface 93 provide a tooth-like projection 136 which is shaped to correspond to the notches 124 in the strip.

As seen in FIG. 11, the forward surface comprises a projection leading ramp-like engagement surface 146 and a projection trailing ramp-like engagement surface 148 which define the projection 136 therebetween.

A single cycle of driving one screw 12 and advancing the strip so as to position the next screw is now described with reference to FIGS. 11, 12 and 13.

FIG. 11 shows the screwdriver assembly at a point in time in a cycle when the screwdriver bit 24 has moved forwardly to engage the recess in the screwdriver head and to initially urge the screw 12a towards the workpiece. The forward surface 122 of the strip is urged into engagement with the forward surface of the exitway 50 with the tooth-like projection 136 received in mating registry in the notch 124 of the screw strip preceding the screw 12a to be driven. The screw 12a to be driven is thus positioned by reason of its head 16 engaging the sidewall 34 of the guideway 32 and the strip having its notch 124 engaged with the projection 136 of the exitway. Subsequently, the screwdriver shaft 20 moves forwardly and drives the screw into a workpiece and, in so doing, the head of the screw passes through the sleeve 104 of the strip rupturing the straps 120.

Figure 12:
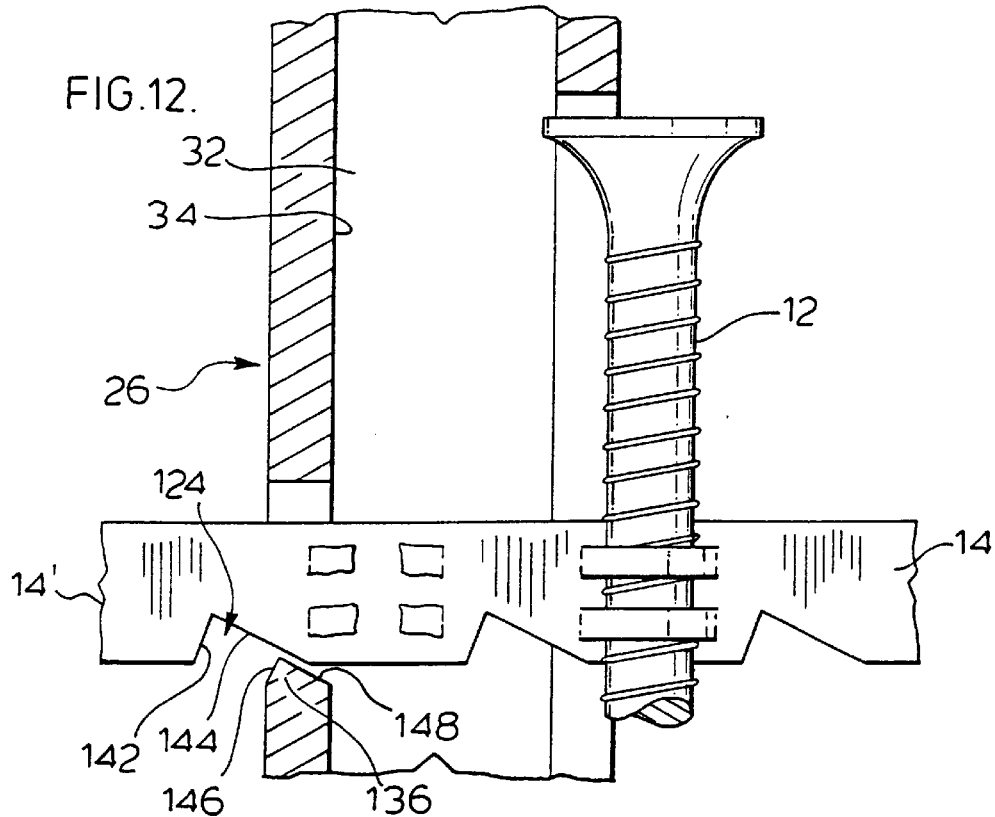
FIGS. 12 and 13 show the embodiment of FIG. 11 with the screw strip in different relative positions in a feed cycle.

FIG. 12 shows a subsequent position in a cycle in which after fully driving the screw, the bit 24 has been retracted and the screw feed mechanism is in the process of advancing the screw strip towards the left. In the slide pawl 78 moving the next screw towards the left, disengagement of the projection 136 in the notch 124 is assisted by interaction between the notch trailing surface 144 and the projection trailing surface 148 camming the strip rearwardly away from the projection 136 of the forward surface. The screw feed mechanism advances the strip towards the left until the head 16 of the next screw 12 engages the guideway inner surface 34 as shown in FIG. 13 with the notch 124 in rough alignment rearward of projection 136.

Figure 13:
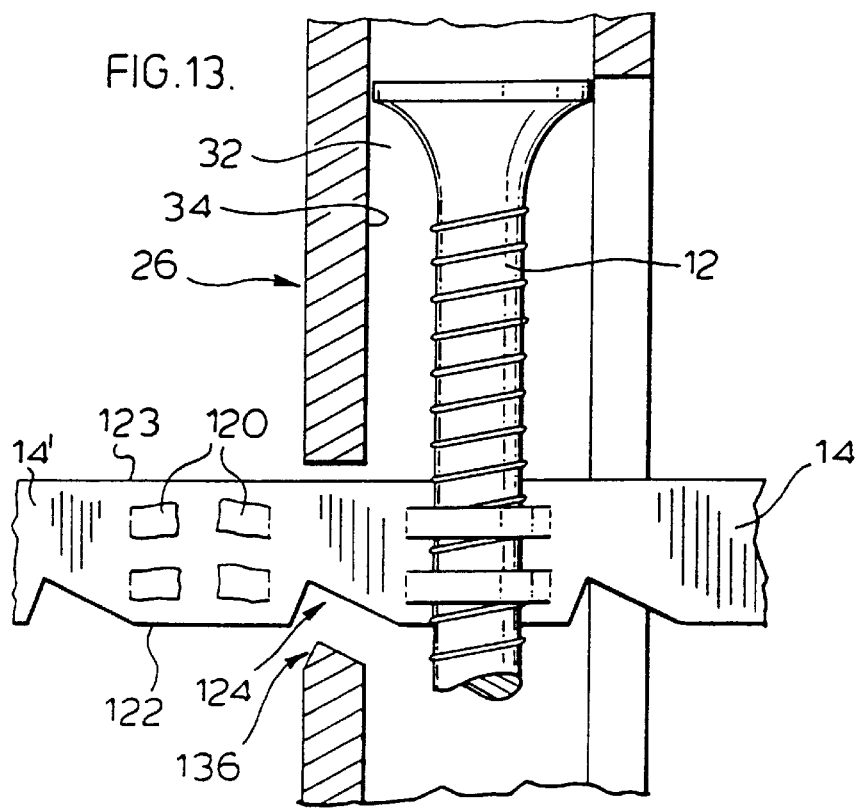

From the position in FIG. 13, the cycle then returns to the position shown in FIG. 11 with the bit 24 moving forwardly to engage the screw head and urge both the screw and its strip forwardly. In the strip being moved forwardly from the position of FIG. 13 to the position of FIG. 11, the surfaces of the projection and notch interact to assist in engagement of the projection and notch. Engagement between trailing and/or leading surfaces of the projection and trailing and/or leading surfaces of the notch will cam the strip to move it to the left or the right to locate the notch precisely on the projection. Thus, the interaction between the surfaces of the projection and tooth will move the strip transverse to the axis of the guide tube 26, that is, along the longitudinal direction of the strip 14.

In the context of a power screwdriver as shown in FIGS. 1 to 3, the feed pawl 78 in each cycle on being moved to the right so as to be able to advance the next screw to the right of the pawl 78, to some extent frictionally engages the strip 14 and its screws 12 and can draw the strip 14 back to the right. Such "feed pawl drawback" can be disadvantageous. However with a notched screw strip of FIG. 10, the engagement of the notch 124 and the projection 136 can advantageously avoid the disadvantage of the strip being drawn back by feed pawl drawback beyond a desired position with the screw in alignment with the bit 24. To avoid feed pawl drawback the projection leading surface 146 and the notch leading surface 142 may preferably be perpendicular to the longitudinal along the strip and thus parallel the drive shaft axis. Feed pawl drawback may be intentionally designed to occur and be utilized as a vehicle for ensuring positive location of the notch 124 on the projection 136.

In the preferred embodiments shown, the forward surface 93 of the exitway 50 is provided with projection 136 to engage notch 124 in the strip. The provision of projection 136 and uniformly spaced notches 124 are advantageous to form a system for locating the strip. The projection 136 and notches 124 may have different configurations. For illustration the projection and notch have been shown to extend about ⅓ of the width of the strip. It is to be appreciated that smaller notches could readily be used. The notches and projections may have many other shapes than that shown.

The preferred embodiment shows forward surface 93 having a projection 136 which is generally uniform in a direction transverse to the longitudinal of the strip. Surface 93 and/or its projection 136 could be provided to vary in a direction transverse to the longitudinal to assist in locating the strip in a desired position in this direction. However, in the use of a screw strip, it is to be appreciated that latitude needs to be given for the strip to deflect transversely to the longitudinal of the strip in the head of the screw forcing itself through the sleeve and past the strip.

The extent to which notches and projections may be desired in any screwdriver assembly will vary to some measure with factors which will influence the accuracy with which a screw cones to otherwise be positioned in the guideway. The length of the screw; the nature of the screw head such as whether it has a square recess or Phillips recess and whether a screw head may be shaped for engagement by a socket; the extent to which the screw head is closely sized to the diameter of the guideway; the relative position of the strip on the screws compared to the location of the head; and where, how and if the advancing pawl engages the screw and/or its strip; are all features which have a bearing on whether projections and notches may be desired.

In addition to the forward surface 93 of the exitway, specific location of the side surface 94 and rear surface 95 of the exitway may also be advantageous. The side surface 94 may, to some measure, engage surfaces of the strip to assist in locating the strip within the exitway. The rear surface 95 must, in the embodiment of FIGS. 10 to 13 shown in which the strip must move rearwardly for the notches 124 to disengage the projection 136, be provided sufficiently rearwardly from the forward surface 93 that the strip can move rearwardly and clear the projection 136. In other configurations such as in FIGS. 1 to 9 in which the forward surface 93 does not incorporate a projection but merely extends radially, the rear surface 95 may be provided spaced from the forward surface 93 a distance only marginally larger than the height of the strip so as to assist in accurately guiding the strip therethrough.

In the context of screw strips utilizing notches to engage a projection, the screw feed mechanism could incorporate feed pawls which activate so as to assist in directing the screw strip rearwardly for disengagement of the pawl and for subsequent movement forwardly once the next subsequent notch comes to be aligned above the projection.

While the embodiment of FIG. 10 shows notches 124 in the strip 14 and a mating projection 136 of the guide tube 26, it is to be appreciated that projections could be provided on the strip and notches about exitway 50 of the guide tube. Similarly in replacement of any notches or projections, shoulders, steps and the like could be substituted.

The invention has been described with reference to the particular construction of U.S. Pat. No. 4,146,871 for a power screwdriver incorporating the guideway received in a slide body. It is to be appreciated that the invention may readily be adapted to other known fastener installation tool configurations including nut drivers and the like and both power and manual tools.

The invention has been described with reference to a preferred screwdriver assembly which incorporates an automatic screw feed assembly. The invention is, however, readily adapted for use with other screw feed assemblies and, as well, for unautomated, manual screw feed systems. For example, in the context of FIGS. 1 to 6 the feed mechanism elements, namely lever arm 68 and/or pawl 78, could be eliminated. The screw strip could be advanced merely by a user manually grasping the strip where it exits the exitway 50 and drawing the strip to the left after each screw has been driven. A simple tool would result having increased simplicity particularly suitable for manufacture at low price and sale to the household.

Figure 14:
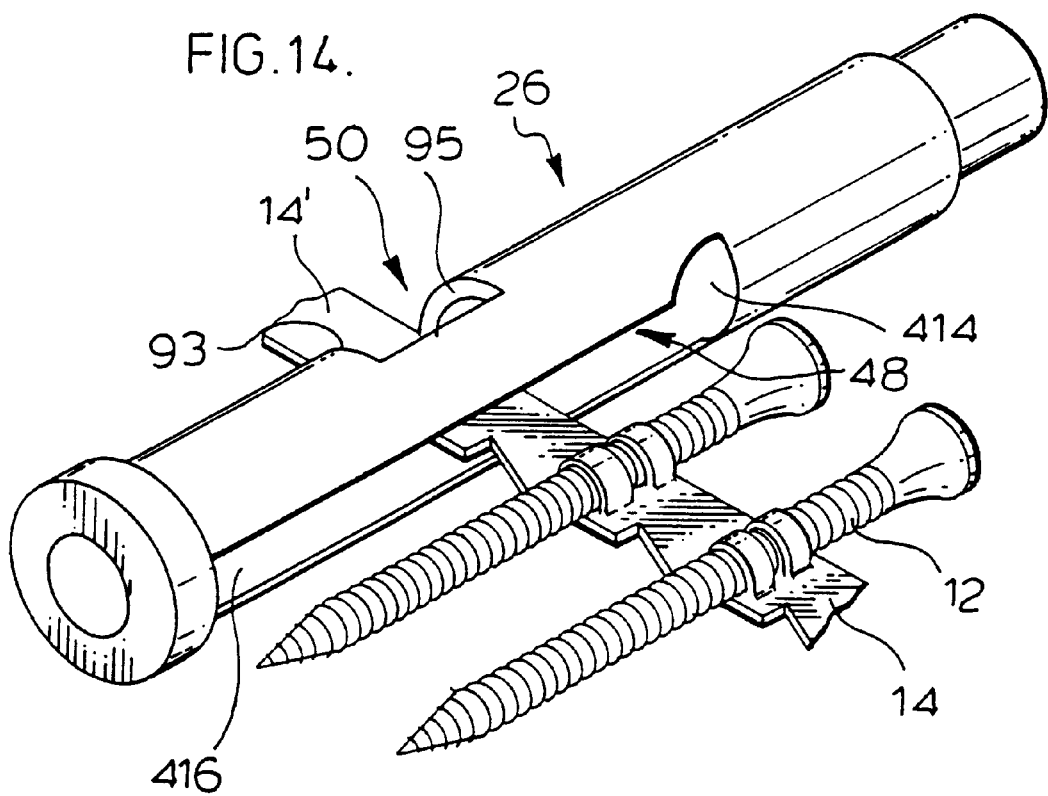
FIG. 14 is a pictorial view of a guide tube in accordance with a fifth embodiment of the present invention adapted for use with the notched screw strip of FIG. 10.
Figure 15:
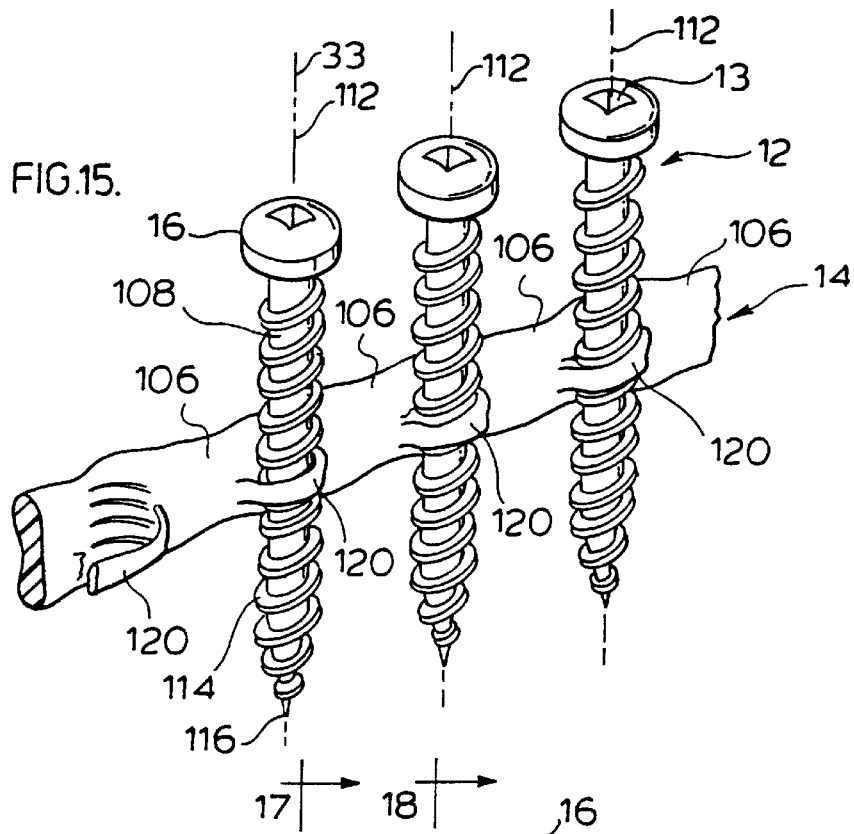
FIG. 15 shows a perspective view of a screw strip in accordance with a fifth embodiment of the present invention.
Figure 16:
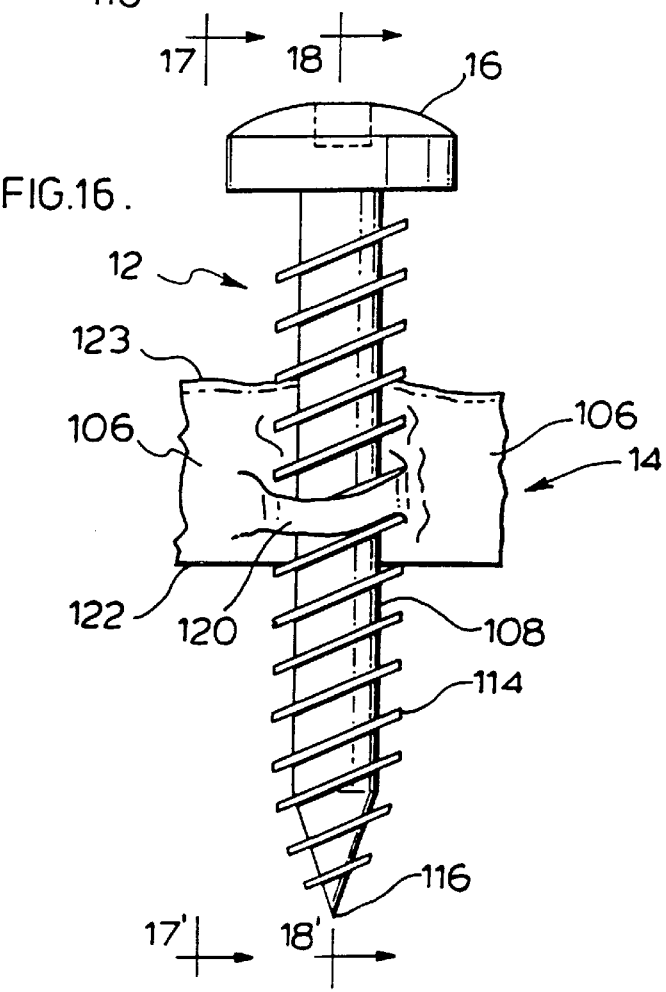
FIG. 16 is a front elevation view of one screw in the strip of FIG. 15.

FIG. 14 shows a pictorial view of the guide tube 26 shown in cross-section in FIG. 10 and illustrating features in accordance with a fifth embodiment.

As seen in FIG. 14 the guide tube 26 has many similarities to the guide tubes 26 in the other embodiments and is adapted to form a guide tube for use, for example in substitution for the guide tube of FIGS. 5 and 6. The entranceway 48 is shown closely sized to the shape of the screws 12 and with an enlarged head entrance portion 414 and a reduced shank entranceway 416. This has the advantage that in a screw being driven once the head advances forwardly past enlarged head portion 414 the sidewall 34 extends about the head more than 180° so as to positively locate the head coaxially in the guideway. The guide body has at its forward end a touchdown ring 416 which extends 360° about a screw being driven.

The exitway 50 is enclosed in the sense that it is bounded on both sides as well as by its forward surface 93 and rear surface 95.

In the embodiment of FIG. 14, the rear surface 95 of the exitway 50 may preferably be spaced a distance above the rearward most point of projection 136 equal to or marginally less than the width of the strip between forward surface 122 and rear surface 123. By having this distance less than the width of the strip, on the strip being moved to the left, the land 106 will become compressed across its width and will deflect to permit the strip to be moved to the left. This deflection will inherently bias the strip 14 towards the projection 136 such that the notch 124 cannot become disengaged from projection 136 without compressing the width of the strip. Alternate embodiments to accomplish this could provide a spring loaded mechanism carried by guide tube 26 rearwardly of the strip 14 to bias the strip 14' where it exits the slide body 52 downwardly into the support surface 93. Such mechanisms would appear advantageous in a manual system in which a user manually advances the screw strip to ensure that in handling the power tool between driving screws that the screw strip may not be dislodged or become improperly positioned. In a manual system, it may also be preferable to have a one-way pawl not dissimilar to pawl 78 which permits a screw to advance to the left as seen in the FIG. 14 but does not permit the screws once advanced to move back to the right. Such a pawl could act on any of the screws in the screw advance guideway 206.

With the invention of the present application, an advantage is that insofar as the strip is supported by portions of strip preceding a screw to be driven, the system of the present invention permits the last screw in any strip to be driven and is particularly advantageous for use with shorter length strips such as six to fifty screws in length. This advantage arises whether or not a footplate 200 as illustrated in FIGS. 1 to 6 is utilized in that even with a footplate 200 to pinch the next screw 12*b* to be driven, when a last screw 12*a* is being driven and there is no screw 12*b*, support of the last 12*a* is more particularly desired.

The present invention provides a number of different mechanisms for locating a screw 12*a* to be driven in alignment with the drive shaft 20. These include the engagement of a head 16 of a screw with the sidewall 34 in first engagement portion 42 in the guide tube, the engagement of a washer 208 with the sidewall 234 in the second engagement portion 47 in the guide tube, the engagement of the rearward surface 122 of a strip on the forward surface 93 of the exitway, the engagement of indexing notches 124 on the strip with complementary projections 136 in the forward surface 93 of the exitway, the engagement of the forward surface 123 of a strip on the rear surface 95 of the exitway, and the holding of a next screw 12*b* to be driven by the footplate 200. The use of any one or more of these mechanisms may be sufficient to locate a strip without use of other of the mechanisms. For example in the context of all the embodiments shown the footplate 200 is not required and the screw 12 can adequately be located for practical use merely by eliminating the footplate or eliminating the portion of the footplate 200 carrying the recess 208 with or without affixing the remainder of the foot body to the slide body against relative sliding motion. The embodiment of FIG. 9 is particularly adapted for use with the engagement between the notch 124 and projection 136 and the engagement between the screw head 16 and the sidewall 34 to locate the screw. In the context of FIGS. 6 and 7, the footplate is not required due to second engagement portion 234. Of course the embodiment of FIGS. 1 to 7 could be provided with strips having notches 124 to be engaged by projection 136.

Reference is now made to FIGS. 15 to 19 which show as a fifth embodiment of the present invention, another plastic holding strip 14 of the type taught by Canadian Patent 1,054,982. The same reference numbers as used to describe FIGS. 10 to 13 are used in FIGS. 15 to 19.

As is the case with the strip of FIGS. 10 to 13, the lands 106 in FIGS. 15 to 19 are shown as extending both between adjacent screws 12, that is, horizontally as seen in the rear view of FIG. 19, and axially of the screws 12, that is, in the direction of the longitudinal axes 112 of the screws. Thus, the lands comprise webs of plastic material provided over an area extending between sleeves 104 and between the forward surface 122 and the rear surface 123. As best seen in FIG. 17, showing a cross-sectional end view through one land 106, the land 106 effectively is disposed about a plane indicated as 115 in FIG. 17 which is parallel to a plane in which the axes 112 of all the screws lies. Thus, the lands 106 comprise a web which is disposed substantially vertically compared to the vertically oriented screws as shown in the figures. The lands 106 and the sleeves 104, in effect, are disposed as a continuous, vertically disposed strip along the rear of the screws 12, that is, as a strip which is substantially disposed about a plane 115 which is parallel to a plane containing the axes of all screws.

As shown in dotted lines, the strip 14 of FIGS. 15 to 19 could be provided with slots 124 in its forward surface 122, if desired. The strip 14 could also be provided with a horizontally extending reinforcing flange 125 along its length as illustrated by the dotted lines in FIG. 18. The lands 106 are shown as spaced to one side of axes 112 of the screws, however, this is not necessary, and the lands 106 could be provided in alignment with the axes or otherwise. A preferred feature of the strip is that it may bend to assume a coil-like configuration due to flexibility of the lands 106, such that, for example, as seen in a plan view to FIG. 15, the strip could be disposed with the heads of the screws disposed into a helical coil, that is, the plane in which all the axes 112 of the screws lie may assume a coiled, helical configuration to closely pack the screws for use. Having the lands 106 and sleeves as a vertically extending web lying in the plane parallel that in which the axes 112 permits such coiling.

Preferably, the forward surface 122 is spaced a constant distance rearwardly from the tips 116 of the fastener. Thus is follows that the forward surface 122 is spaced a constant distance forward of the heads 16 of the screws 12, given that the screws 12 are each of a constant length.

While the invention has been described with reference to preferred embodiments, the invention is not so limited. Many variations and modifications will now occur to a person skilled in the art. For definition of the invention, reference is made to the following claims.

What I claim is:

1. A screwdriver assembly to drive threaded fasteners collated together in a strip spaced in parallel relation from each other, the screwdriver comprising:

a cylindrical guideway to receive a fastener coaxially therein, a fastener-and-strip entranceway opening generally radially into the guideway on a first side thereof, a strip exitway opening generally radially out of the guideway on a second side thereof opposite the entranceway, the guideway, the entranceway and the exitway juxtapositioned to permit fasteners collated in a strip spaced in parallel relation from each other to be successively advanced through the entranceway radially into the guideway to locate each successive fastener coaxially within the guideway with portions of the strip from which fasteners have been driven extending from the guideway via the exitway, an elongate, rotatable driver shaft having at a forward end a bit, the shaft reciprocally movable axially in the guideway to engage the fastener with the bit and drive the fastener axially forwardly from the guideway into a workpiece, the exitway having an axially, rearwardly directed strip supporting surface axially forward of the strip for engagement by the strip to support the strip against movement forwardly on the shaft driving a fastener axially forwardly.

2. A screwdriver assembly as claimed in claim 1 wherein the strip supporting surface is fixed against movement relative to the guideway.

3. A screwdriver assembly as claimed in claim 1 wherein the strip supporting surface includes support locating means to engage in registry with strip locating means on the strip to locate the strip in a desired position to assist in maintaining the fastener coaxially disposed within the guideway.

4. A screwdriver assembly as claimed in claim 3 wherein the strip locating means comprises:

uniformly spaced notches on forward surfaces of the strip extending rearwardly transverse to a longitudinal of the strip, and the support locating means comprises a rearwardly extending projection complimentary to the notches to be received therein.

5. A screwdriver assembly as claimed in claim 4 wherein the projection or notches have ramp-like engagement surfaces which assist in disengagement of the projection and each successive notch by camming the strip rearwardly away from the strip supporting surfaces on advancing the strip through the exitway.

6. A screwdriver assembly as claimed in claim 5 wherein the ramp-like engagement surfaces include surfaces which assist in engagement of the projection and each successive notch in a desired juxtaposition by camming the strip to move transversely relative to the guideway on the strip being urged forwardly into the strip supporting surface.

7. A screwdriver assembly as claimed in claim 2 wherein the guideway engages the head of a fastener received therein to assist in axially locating the head of the fastener coaxially within the guideway.

8. A screwdriver assembly as claimed in claim 7 wherein:

the guideway is adapted to receive fasteners having a screw head of a first diameter, the guideway having an inner diameter marginally greater than the first diameter, the guideway extending about the head of the fastener axially rearward of the exitway at east about 120°.

9. A screwdriver assembly as claimed in claim 8 wherein the guideway extends about the head of the fastener about 180° axially rearward of the exitway.

10. A screwdriver assembly as claimed in claim 2 further including a fastener feed guide mechanism to guide fasteners collated in the strip into the entranceway.

11. A screwdriver assembly as claimed in claim 2 further including a fastener feed mechanism to successively, incrementally advance fastener collated in the strip through the entranceway into the guideway.

12. A screwdriver assembly as claimed in claim 3 wherein the strip supporting surface is fixed against movement relative to the guideway.

* * * * *